Aug. 26, 1924.

H. H. ILER 1,506,642

GEAR WHEEL

Filed June 16, 1923

Inventor

H. H. Iler.

By Eccleston & Eccleston

Attorneys

Patented Aug. 26, 1924.

1,506,642

UNITED STATES PATENT OFFICE.

HENRY H. ILER, OF HILLSBORO, NORTH CAROLINA.

GEAR WHEEL.

Application filed June 16, 1923. Serial No. 645,766.

*To all whom it may concern:*

Be it known that I, HENRY H. ILER, a citizen of the United States, residing at Hillsboro, in the county of Orange and State of North Carolina, have invented certain new and useful Improvements in Gear Wheels, of which the following is a full, clear, and exact description.

My invention relates to gear wheels, sprocket wheels, and in fact to any type of wheel where it might be desirable to change the style or size of the rim portion or to repair the latter. An object of the invention resides in the provision of a gear wheel or the like with a rim composed of a plurality of sections which may be readily attached to or removed from the body portion of the wheel.

A further object of the invention consists in the provision of means for attaching the toothed segments to the wheel in such manner as to avoid the necessity of increasing the width of the wheel so as to render the same too large for ordinary use. It is another object of the invention to provide an attaching means for the segments which will avoid the requirement of an elaborate or specially constructed wheel to receive and hold the rim sections.

Other objects and advantages of the invention will be apparent from the following description when taken in connection with the accompanying drawings, in which.

Figure 1:
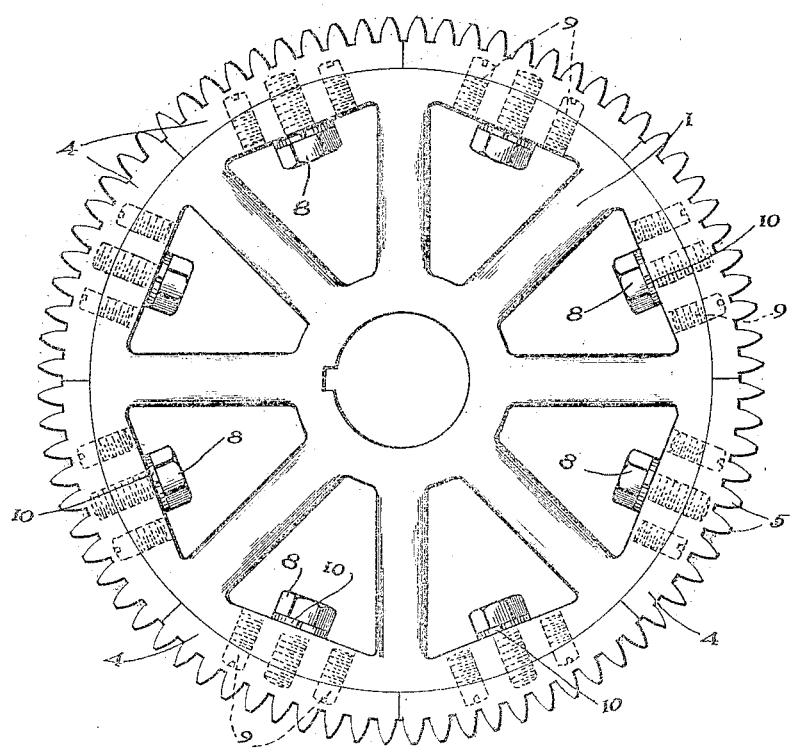
Figure 1 is a side elevation of the gear wheel assembled.
Figure 2:
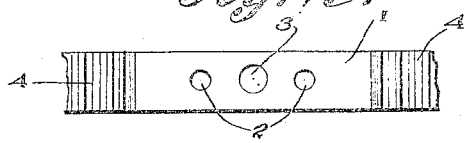
Figure 2 is an edge view of the wheel with one of the rim segments removed.
Figure 3:
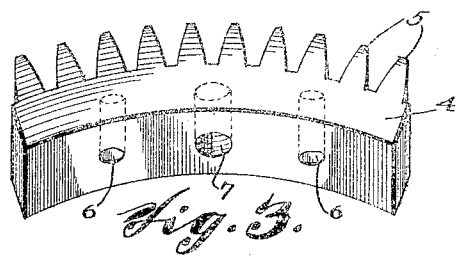
Figure 3 is an enlarged perspective view of one of the rim segments removed from the wheel.

Referring to the drawings more in detail, the numeral 1 refers to the body portion of a wheel, and, while for the purpose of illustration a spoked wheel is shown, it will be understood that the invention is equally well adapted to use in connection with any other type of wheel or pulley.

For the purpose of securing the rim proper, which may be toothed or otherwise, to the body portion of the wheel, the latter is provided with eight sets of apertures, each set comprising two parallel apertures 2, and an intermediate radially extending aperture 3. It is not my intention, however, to be limited to the particular number of sets of apertures or to the particular number of apertures of each set, as these numbers may be readily altered without in any way departing from the spirit of the invention.

Numeral 4 indicates the rim sections or segments here shown as provided with gear teeth 5. Each segment 4 is provided with a pair of parallel cylindrical recesses 6 to align with the apertures 2 of the body portion of the wheel. A third cylindrical recess 7 is disposed in each rim section 4 intermediate the recesses 6 and is interiorly threaded to receive the locking bolt 8 which is first passed through the aperture 3 of the body portion of the wheel.

In assembling the wheel and rim sections dowel pins 9 are first threaded into the apertures 2 so as to extend somewhat beyond the periphery of the body portion of the wheel. The segments 4 are then slipped into place with the dowel pins seating in recesses 6. The bolts 8 are now passed through the apertures 3 and threaded into the recesses 7 of the segments 4, lock washers 10 being provided for holding the bolts in position.

In the operation of the wheel the bolts 8 act merely to hold the segments to the body portion of the wheel, while the dowel pins 9 afford the means for transmitting the power from the body portion of the wheel to the rim sections.

From the foregoing description taken in connection with the accompanying drawings it will be seen that I have provided a very simple yet substantial structure for attaching rim sections to a wheel; that the size and shape of the wheel are in no way modified in applying the invention, and that the invention may be employed with gear wheels having fine as well as coarse teeth, due to the fact that neither the dowel pins nor the bolts 8 extend entirely through the rim segments.

In accordance with the patent statutes, I have described what I now believe to be the best embodiment of the invention, but I do not wish to be understood thereby as limiting myself or the scope of the invention, as many changes and modifications may be made without departing from the spirit of the invention; all such I aim to include in the scope of the appended claim.

What I claim as new and desire to secure by Letters Patent is:

In a gear wheel, a body portion comprising a hub and rim, spokes connecting said hub and rim, a threaded bolt located between each pair of spokes and extending outwardly through the rim, dowel pins positioned at opposite sides of each of the threaded bolts and extending outwardly through the rim, and a plurality of toothed segments of small arc each provided with a threaded recess for the reception of the threaded bolt and adjacent parallel recesses in which the dowel pins are received.

HENRY H. ILER.